(12) United States Patent
Tsuchiya

(10) Patent No.: US 7,271,970 B2
(45) Date of Patent: Sep. 18, 2007

(54) COMPOSITE MAGNETIC HEAD ARRANGED SO THE REPRODUCING ELEMENTS DO NOT OVERLAP A POLE OF A RECORDING ELEMENT

(75) Inventor: Reijiro Tsuchiya, Fujisawa (JP)

(73) Assignee: Hitachi Global Storage Technologies Japan, Ltd., Odawara-shi (JP)

( * ) Notice: Subject to any disclaimer, the term of this patent is extended or adjusted under 35 U.S.C. 154(b) by 360 days.

(21) Appl. No.: 10/964,698

(22) Filed: Oct. 15, 2004

(65) Prior Publication Data
US 2005/0134990 A1  Jun. 23, 2005

Related U.S. Application Data

(63) Continuation of application No. 09/956,976, filed on Sep. 21, 2001, now Pat. No. 6,816,344.

(30) Foreign Application Priority Data

Jan. 17, 2001  (JP)  ............................. 2001-008432

(51) Int. Cl.
*G11B 15/12*  (2006.01)
(52) U.S. Cl. .................... 360/61; 360/63; 360/317; 360/316
(58) Field of Classification Search ............... None
See application file for complete search history.

(56) References Cited

U.S. PATENT DOCUMENTS 5,065,483 A  11/1991  Zammit ............... 29/603.09
5,212,611 A  5/1993  Dee ..................... 360/316
5,335,127 A  8/1994  Nagata et al. ........... 360/316
5,444,589 A  8/1995  Hu et al. ................ 360/317
5,719,729 A  2/1998  Koyama et al. .......... 360/317
5,850,325 A  12/1998  Miyauchi et al. ......... 360/319
5,963,400 A  10/1999  Cates et al. ............. 360/317
6,097,571 A  8/2000  Draaisma et al. ......... 360/125
6,157,510 A * 12/2000  Schreck et al. ......... 360/77.06
6,317,282 B1 * 11/2001  Nam ..................... 360/61
6,362,934 B1  3/2002  Hungerford et al. ....... 360/121
6,373,648 B2 * 4/2002  O'Connor ............... 360/63

(Continued)

FOREIGN PATENT DOCUMENTS

JP  9-102101  4/1997

(Continued)

*Primary Examiner*—Andrea Wellington
*Assistant Examiner*—Dan I Davidson
(74) *Attorney, Agent, or Firm*—Mattingly, Stanger, Malur & Brundidge, P.C.

(57) ABSTRACT

A conventional magnetic head has a structure, in which a MR element and a recording element are stacked. The influence of a recording magnetic field on the magnetically sensitive portion of a reproduction element is lessened and the performance of the MR element is stabilized. Also, the reliability of the magnetic disk drive using a MR element is enhanced. The magnetic disk drive uses a composite magnet head, which has a plurality of reproduction elements arranged such that the magnetically sensitive layer of a reproduction element of the composite magnetic head does not overlap with the normal direction projection of the recording element, and which lessens the influence of a recording magnetic field on the magnetically sensitive portion of each reproduction element.

13 Claims, 7 Drawing Sheets

U.S. PATENT DOCUMENTS

| | | |
|---|---|---|
| 6,469,875 B1 | 10/2002 | Chen et al. ................. 360/317 |
| 6,646,830 B2 | 11/2003 | Biskeborn et al. .......... 360/129 |
| 6,882,508 B2 * | 4/2005 | Yamaguchi et al. ........ 360/317 |

FOREIGN PATENT DOCUMENTS

| | | |
|---|---|---|
| JP | 10-149519 | 6/1998 |
| JP | 11-39619 | 2/1999 |
| JP | 2000-339638 | 12/2000 |
| JP | 2001143218 A * | 5/2001 |

* cited by examiner

US 7,271,970 B2

COMPOSITE MAGNETIC HEAD ARRANGED SO THE REPRODUCING ELEMENTS DO NOT OVERLAP A POLE OF A RECORDING ELEMENT

This is a continuation application of U.S. Ser. No. 09/956,976, filed Sep. 21, 2001 now U.S. Pat. No. 6,816,344.

BACKGROUND OF THE INVENTION

1. Field of the Invention

The present invention is related to a way of using a magnetic head in a magnetic disk drive, and more particularly, to a magnetic head, which utilizes a magneto-resistive effect-type electromagnetic conversion element, and a magnetic disk drive for reproducing information using this magnetic head.

2. Description of the Related Art

In recent years, a magneto-resistive effect element (MR element) has been utilized in a magnetic disk drive as an element for reproducing magnetically recorded information. An MR element is one that uses changes in resistivity (magneto-resistive effect) corresponding to leakage magnetic fields from a recording medium, and compared to a conventional inductive-type element, has higher reproduction sensitivity, and is not dependent on circumferential speed. In other words, when detecting magnetic changes recorded on a disk medium, which is a recording medium, when using an MR head, detection output does not vary much even if the rotational speed of the disk medium changes. These characteristics are extremely effective for increasing the capacity of a magnetic disk drive and making a disk medium smaller in diameter, and magnetic heads equipped with MR elements are rapidly coming into widespread use now.

FIG. 2 schematically depicts the constitution of an ordinarily used recording medium and the MR element portion of a magnetic head. Most of the area of the MR element 1, which is sandwiched between electrodes 2, is occupied by a single magnetic domain, and when there is no leakage magnetic field from a recording medium 4, either a bias magnetic field is applied, or anisotropy, such that a bias magnetic field exists, is provided so that magnetization occurs in a predetermined direction. This one area is called the magnetically sensitive portion, and by superimposing leakage magnetic fields 6 generated by the recording medium 4, the direction of magnetization is readily rotated from the initial state, and the resistivity of the MR element 1 changes in accordance with the angle of rotation thereof. Therefore, this one area functions effectively for reproducing information, and the width of this area is equivalent to the width of the magnetic head reproduction track.

Shielding layers 3 on both sides of the MR element 1 are arranged for the purpose of enhancing spatial resolution. Even when information is recorded on a recording medium 4 at a high density, it is done so as to prevent the interference of the leakage magnetic fields 6 corresponding to each piece of information, and to enable the separation of each piece of information. The constitution of the MR element portion is as described hereinabove, and even for ones that utilize GMR (giant magnetoresistive effect), which uses a spin-valve system in the magnetically sensitive portion, GMR having a stacked structure, TMR (tunneling magnetoresistive effect) that uses a tunnel junction, or other MR elements, the basic constitution of FIG. 2 is the same.

Because a MR element portion only has a reproduction function and does not have a recording function, by stacking a recording element portion, it can be used as a magnetic head having recording and reproduction functions (composite magnetic head). A rough sketch of a typical constitution of a composite magnetic head is shown in FIG. 3. FIG. 3 is a schematic diagram of the element portion of a magnetic head as seen from the side opposite the disk medium (hereinafter referred to as the medium-opposing side). A magnetic pole 5 for recording is stacked onto the MR element 1.

The recording head of FIG. 3 constitutes an inductive element having magnetic pole 5 and shielding layer 3 as two magnetic poles, and records information to a disk medium via a magnetic field which leaks through a gap portion between magnetic pole 5 and shielding layer 3. Composite magnetic heads, which have MR element 1 as reproduction element as shown in FIG. 3, have rapidly come into use in recent years due to the high reproduction sensitivity thereof, promoting rapid increases in magnetic disk drive capacity.

On the other hand, because a MR element is an extremely thin thin-film element, new problems occur. Ideally it is desirable for the magnetic thin film constituting the magnetically sensitive portion of a MR element to form a single magnetic domain, but there are times when new magnetic domains are formed due to heat, stress or an external magnetic field. A change in magnetic domain structure like this is manifested as a change in reproduction characteristics. Further, when a new magnetic domain is formed, it is often accompanied by Barkhausen noise in the reproduction signal. Consequently, a challenge when using a MR element is giving serious consideration to stabilizing reproduction characteristics while enhancing reproduction sensitivity.

In particular, due to the fact that a composite magnetic head stacks a MR element and a recording element, there are cases in which the recording magnetic field at recording affects the MR element, causing changes in the characteristics of the MR element. With the goal of lessening the influence of a recording magnetic field like this, a structure (piggyback structure) like that shown in FIG. 4, which divides into two the layer that served as both a magnetic pole for the recording head and a shield for the MR element, has come into use recently.

Further, as another method for lessening the influence of a recording magnetic field, a structure, which provides a reproduction element portion outside of a range interposed between two perpendiculars lowered from both ends of the gap-opposing surface of the recording magnetic pole as shown in FIG. 5, is disclosed in Japanese Patent Laid-open No. H11-39619.

As for the relation of the gap between the recording and reproduction heads in the prior art, as shown in FIG. 3, because the structure stacks the MR element and the recording element, there are case when a recording magnetic field affects the MR element, causing changes in the characteristics of the MR element. In response to this, the structures of FIG. 4 and FIG. 5 are proposed as structures for lessening the influence of a recording magnetic field.

The inventors of this application, in order to confirm the effects of these structures, investigated the ratio of reproduction error occurrence when recording and reproducing were repeatedly carried out using magnetic disk drives equipped with composite magnetic heads of the constitutions of FIG. 3 through FIG. 5. The investigation was carried out using 100 magnetic disk drives for each of the magnetic head structures. Each magnetic disk drive was equipped with four magnetic heads, the ambient temperature was 55 C., magnetomotive force at recording was varied from 0.275

AT (ampere-turns) to 0.495 AT, and recording and reproducing were carried out 10,000 times at each magnetomotive force.

FIG. 6 is a comparison of when the magnetic heads shown in FIG. 3 and FIG. 4 were used. In the structure of FIG. 3 (3.0 m-thick recording magneticpole-cum-shield layer), which is the prior art, the ratio of magnetic disk drives, in which errors occurred, suddenly increased in line with increases in the magnetomotive force at recording at 0.385 AT and above, clarifying the effects of magnetomotive force at recording.

Further, according to a study of waveforms at error generation, vertical asymmetry occurred in reproduction waveforms, and Barkhausen noise was confirmed, and the causes of error occurrence are assumed to have been the formation of new magnetic domains in the magnetically sensitive portions of the reproduction elements, and altered bias values.

Conversely, in the structure of FIG. 4 (1.5 m-thick shielding layer, 1.5 m lower magnetic pole, and 0.8 m-thick magnetic separation layer for the shield and lower magnetic pole), the ratio of magnetic disk drives, in which errors occurred, dropped greatly, and the improved efficacy by making the magnetic head the constitution of FIG. 4 is evident.

FIG. 7 compares the structures of FIG. 3 and FIG. 5. The structure of FIG. 3 is the same as above, and in the structure of FIG. 5 (3.0 m-thick recording magnetic pole-cum-shielding layer, distance x from recording magnetic pole=0 m, 0.7 m), the ratio of magnetic disk drives, in which errors occurred, greatly decreased by increasing the distance x, and improved efficacy resulting from the constitution of FIG. 5 is evident.

However, upon studying the results of FIG. 6 and FIG. 7, it was ascertained that errors, albeit few, occurred in both the structures of FIG. 4 and FIG. 5 due to increases in magnetomotive force at recording. This indicates that the effects of a recording magnetic field are exerted across a wide range either by going over the shielding, or via the shielding.

In line with increasing the capacity and density of magnetic disk drives in the future, the reduction of the track width and the reduction of the recording bit length in the circumferential direction will be unavoidable, and as a result of this, it will become necessary to give consideration to thermal demagnetization of the recording medium. Since the coercive force of recording media will be increased even more to prevent thermal demagnetization, greater recording capabilities will be required of magnetic heads. Further, reproduction sensitivity must be heightened even more in order to enhance recording density, and strengthening the stability of the MR element itself will be a substantially difficult task.

A composite head that uses a MR element like this must strive for heightened head sensitivity and enhanced recording capabilities in preparation for future demand for increasing the recording density of magnetic disk drives, but these characteristics will give rise to magnetic instability. Although the structures (FIG. 4 and FIG. 5), which are proposed as measures for improving this, exhibit substantial efficacy compared to a conventional head structure (FIG. 3), they will be inadequate to future increases in magnetomotive force at recording.

In the structure of FIG. 4, this is because increases in the layer thickness of the shields 3 and magnetic pole 3' will be unavoidable, as a result of which a drop in formatting efficiency is expected in line with increases in the recording and reproduction gaps. In the structure of FIG. 5, this is because an increase in the divergence x between the recording element and the reproduction element will be unavoidable, as a result of which there is concern that performance will decline in line with offset adjustments at recording and reproduction.

An object of the present invention is to provide a magnetic disk drive capable of enhancing the yield of composite magnetic heads while striving to stabilize the performance of the MR element by reducing the influence of a magnetic field at recording, of enhancing the manufacturing yield of magnetic disk drives as a whole by overcoming performance limits resulting from improvement of the head only, and of reducing post-shipment head defects.

SUMMARY OF THE INVENTION

The present invention is achieved by constituting a magnetic disk drive, which uses a composite magnetic head that arranges a plurality of independent reproduction elements correspondent to one recording element, and which reproduces information by properly selecting and using any one of the reproduction elements. Further, the present invention is achieved by constituting a magnetic disk drive, which provides respective magnetically sensitive layers of a plurality of reproduction elements of a composite magnetic head separately so as not to overlap with the normal direction projections of the recording element, thus enabling the composite magnetic head to lessen the influence of a recording magnetic field by the recording element on a magnetically sensitive portion, and which, equipped with this composite magnetic head, reproduces information by selecting and using any one reproduction element from among a plurality of reproduction elements. Furthermore, following shipment, when a malfunction occurs in a reproduction element that is being used from among the plurality of reproduction elements corresponding to one recording element in the composite magnetic head, the magnetic disk drive is provided with a function for selecting and using a remaining reproduction element, which is not being used.

Furthermore, as technology for making it possible to alter track width, for compensating for read/write offset divergence, and for arranging two magnetic heads on the opposite sides of a magnetic disk medium in mirror symmetry, there is Japanese Patent Laid-open No. H10-149519, but the idea for "providing two reproduction elements, and when a malfunction occurs in either one of those, using the remaining non-malfunctioning reproduction element" is not disclosed therein. This is because an electrode is provided in the middle part of one reproduction element, and it is treated as two reproduction elements. Further, there is no mention of enhancing recovery performance for recovering from a magnetic head malfunction that occurs after a magnetic disk drive has been shipped.

"Plurality of independent reproduction elements" as used here refers to reproduction elements, which are provided independently to enhance the reliability of the reproduction element itself, and does not include cases in which three or more electrodes are formed in one reproduction element to create two reproduction elements.

DESCRIPTION OF THE PREFERRED EMBODIMENTS

Figure 1:
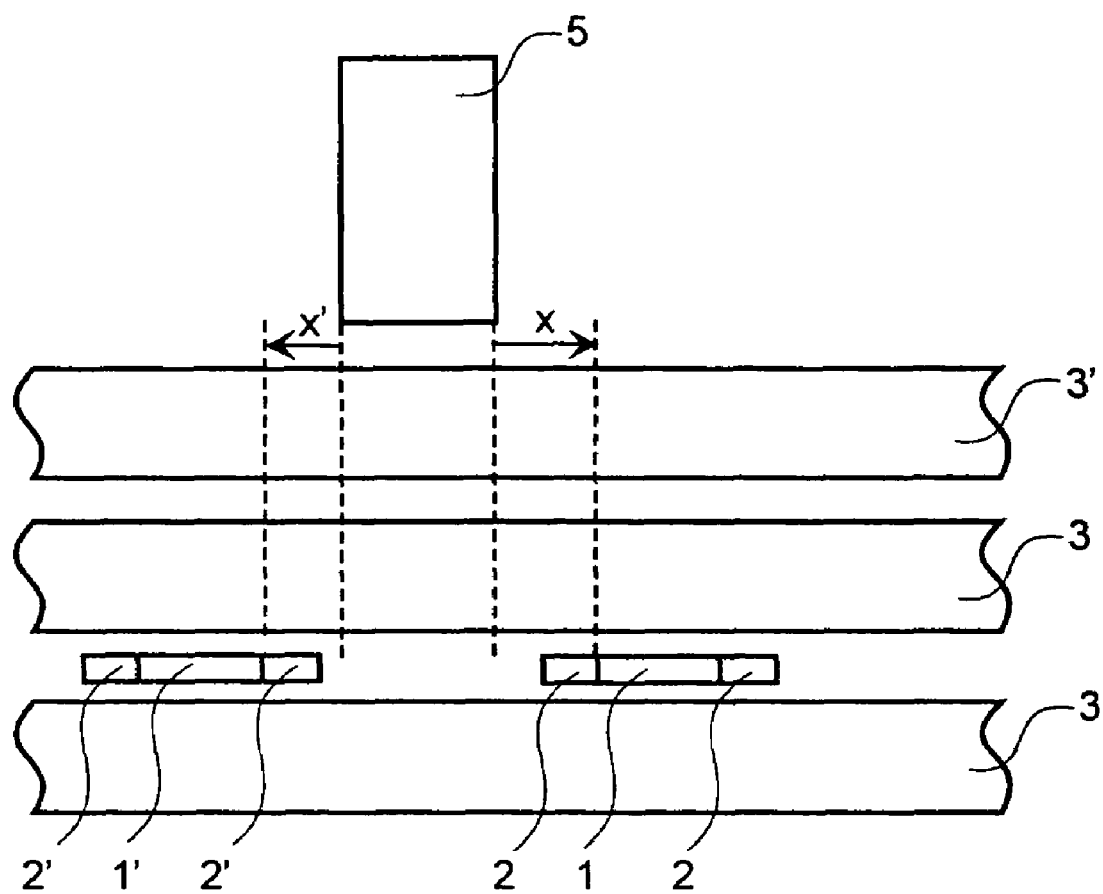
FIG. 1 is a schematic diagram of a magnetic head showing an embodiment of the present invention as seen from the medium-opposing side.
Figure 2:
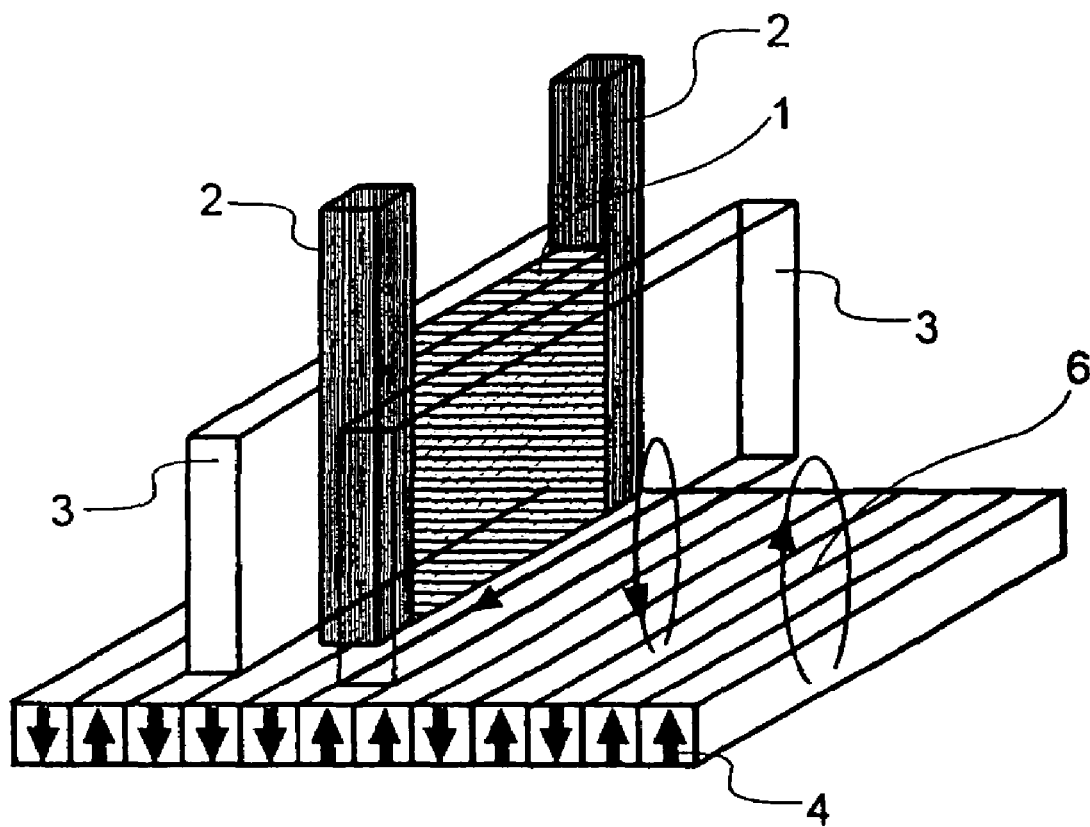
FIG. 2 is a schematic diagram showing a recording medium and an ordinary constitution of a MR element portion of a magnetic head.
Figure 3:
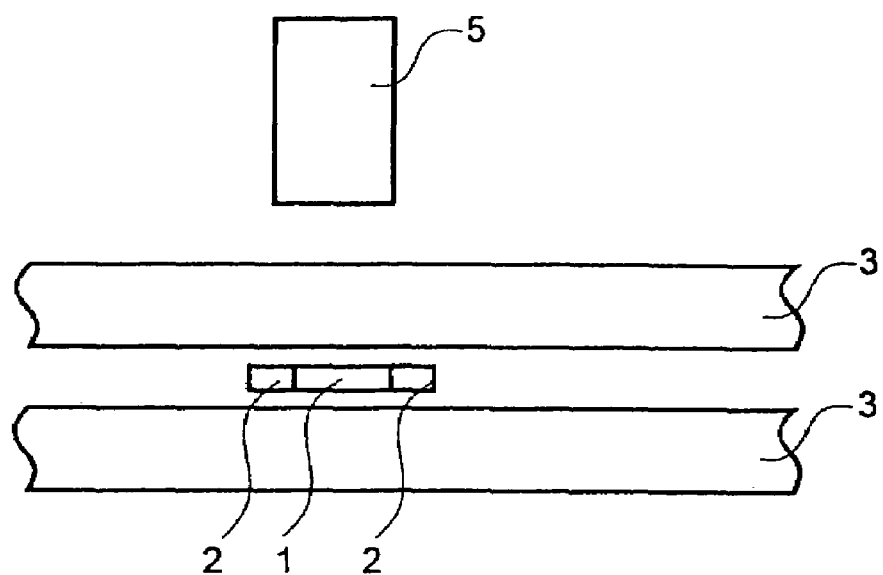
FIG. 3 is a schematic diagram of a conventional magnetic head as seen from the medium-opposing side.
Figure 4:
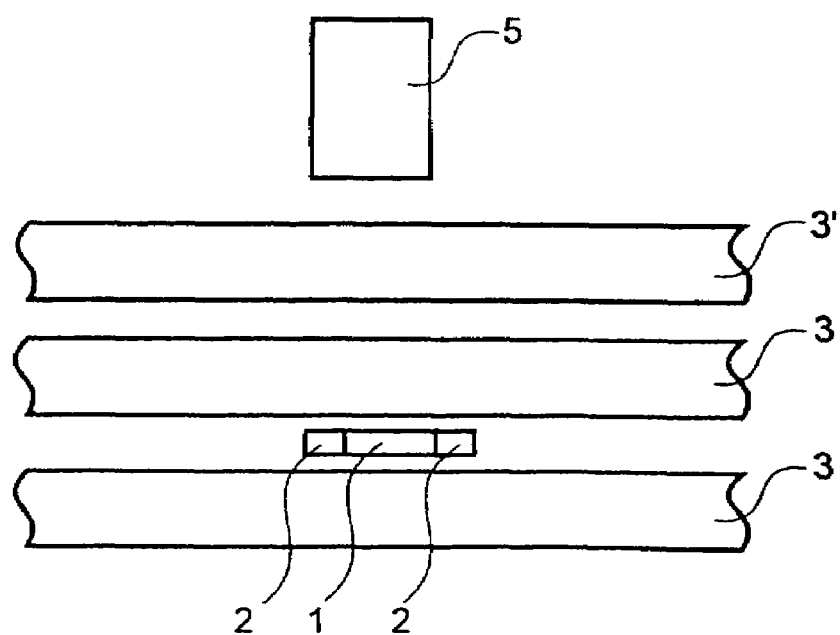
FIG. 4 is a schematic diagram showing a conventional example of a magnetic head, which lessens the influence of a recording magnetic field on a reproduction element.
Figure 5:
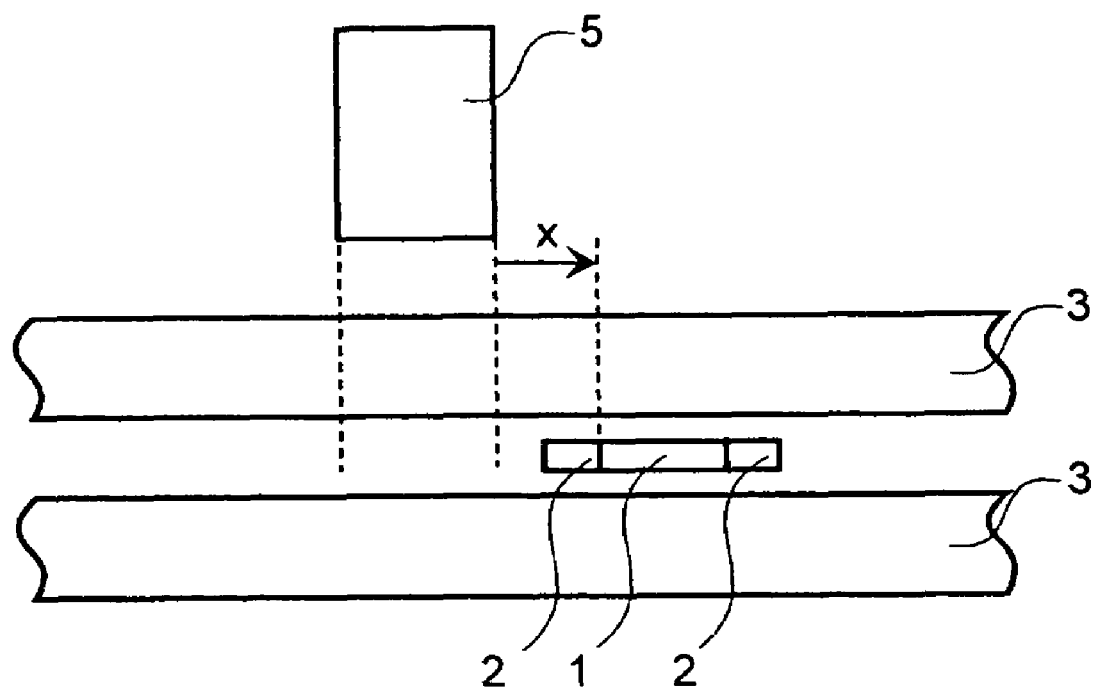
FIG. 5 is a schematic diagram showing another conventional example of a magnetic head, which lessens the influence of a recording magnetic field on a reproduction element.
Figure 6:
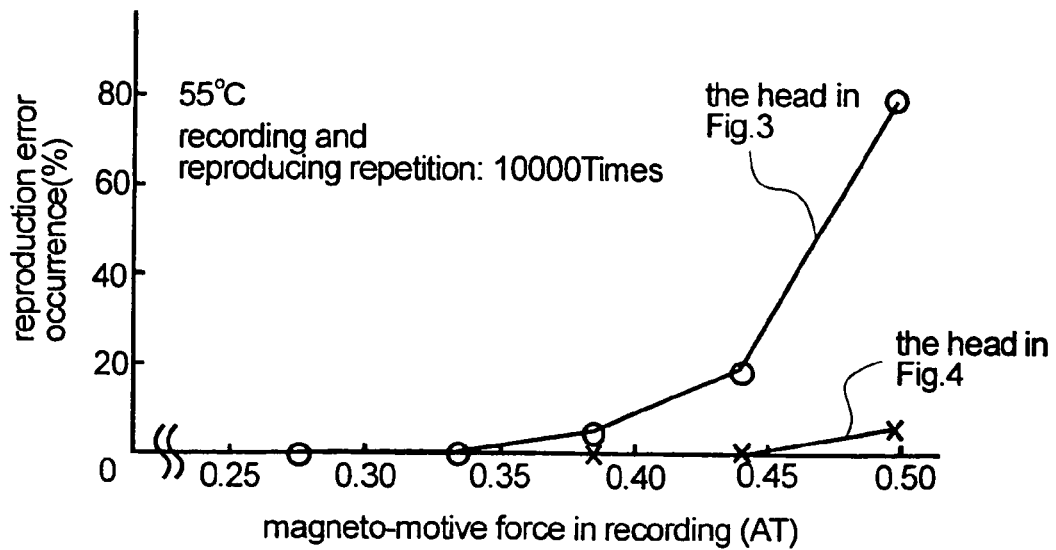
FIG. 6 is a diagram showing the function of magnetomotive force at recording on the reproduction error occurrence ratio of magnetic disk drives mounted with conventional magnetic heads.
Figure 7:
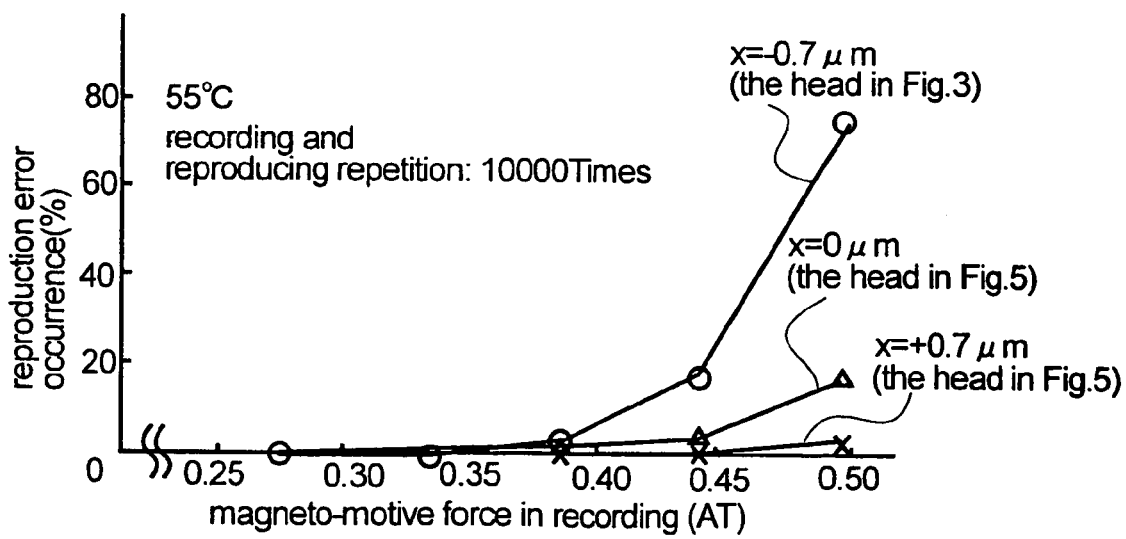
FIG. 7 is a diagram showing the function of magnetomotive force at recording on the reproduction error occurrence ratio of magnetic disk drives mounted with conventional magnetic heads.

A first embodiment of the present invention will be explained using FIG. 1. FIG. 1 is a schematic diagram of a composite magnetic head 7 as seen from the side opposite a magnetic disk medium, which is the recording medium therefor. Leakage magnetic field 6 generated from information stored on the recording medium is converted to electrical signals by the composite magnetic head by moving relatively from the bottom to the top of FIG. 1. This composite magnetic head constitutes a structure in which two reproduction element portions and one recording element portion are stacked. A first reproduction element portion has at the least a first magnetically sensitive portion 1 (MR element 1) and first electrode portions 2, which are conductive and make contact with both end portions of this first magnetically sensitive portion 1. To enhance reproduction resolution, two shielding layers 3, which are arranged on both sides of the first reproduction element with gaps therebetween, are added. A second reproduction element portion, having at the least a second magnetically sensitive portion 1' (MR element 1') and second electrode portions 2', which are conductive and make contact with both end portions of this second magnetically sensitive portion 1', is arranged between the two shielding layers 3 parallel to the first reproduction element portion along a vertical plane in the stacking direction of these elements (in the left-right direction of FIG. 1). The recording element portion is constituted from a magnetic pole 5 for recording, and a lower magnetic pole layer 3', which is arranged with a gap therebetween.

Furthermore, when the magnetic head is mounted to a linear actuator, the stacking direction of the elements is equivalent to the direction of travel of the tracks formed on a magnetic disk medium. Further, the vertical plane in the stacking direction of the elements becomes equivalent of the track width direction.

Here, to lessen the influence of a recording magnetic field from the recording element portion on the first magnetically sensitive portion 1 constituting the first reproduction element portion, the relative positions of first magnetically sensitive portion 1 and magnetic pole 5 are displaced along a vertical plane in the stacking direction of the recording element and reproduction elements (in the left-right direction of FIG. 1), and are arranged so as not to overlap with the recording element portion in the stacking direction of the elements (up-down direction of FIG. 1). Furthermore, displacement in the left-right direction of FIG. 1 can entail displacement in the stacking direction of the elements. Conversely, the relative positions of the second magnetically sensitive portion 1' and magnetic pole 5 are displaced in the opposite direction to magnetically sensitive portion 1, and arranged so as not to overlap in the vertical direction.

Figure 8:
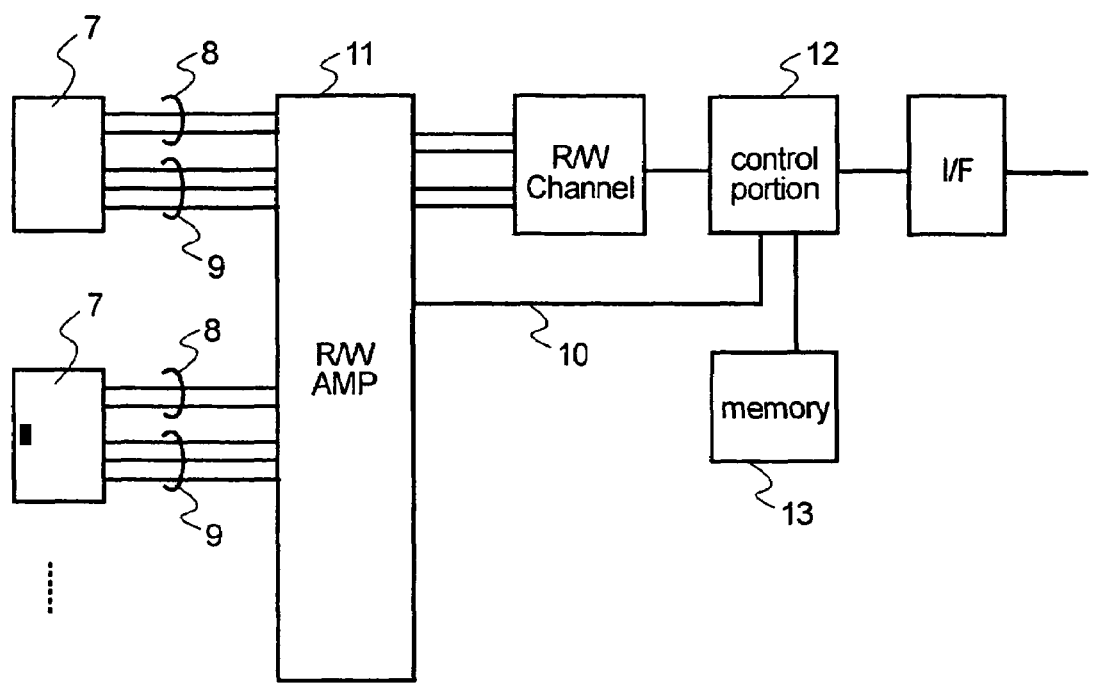
FIG. 8 is a block diagram showing the recording and reproducing channels of a magnetic disk drive mounted with the magnetic head described in an embodiment of the present invention.

FIG. 8 shows a block diagram of recording and reproduction channels of a magnetic disk drive. In FIG. 8, an embodiment of a magnetic disk drive, which is equipped with the composite magnetic heads 7 of FIG. 1, is shown. These recording and reproduction channels have a recording and reproduction amplifier 11 (hereinafter referred to as R/W amp 11), an R/W channel, a control portion 12 and memory 13.

R/W amp 11 can be connected to one or more composite magnetic heads 7 shown in FIG. 1, being connected to each composite magnetic head 7 by one pair of terminals 8 for the recording element and two pairs of terminals 9 for the reproduction elements. Further, R/W amp 11, via a control signal 10, selects a reproduction element of either one of the two reproduction elements of each head 7, and reproduces a signal from recorded information.

An ordinary R/W amp sets a head selection signal via serial data, and a recording head and a reproduction head are simultaneously switched in accordance with this head selection signal. In the R/W amp 11 of this embodiment, the number of terminals for the reproduction elements is twice that of an ordinary R/W amp, and the magnetic head selection method differs from prior methods.

As one present method, there can be cited the method, whereby a head is selected by adding information corresponding to a reproduction element to a conventional head selection signal. In this method, both are recording head and are production head (reproduction element) can be switched via a one-time head selection signal. For example, if the head number is made to correspond to bit[3-1] and the reproduction element number is made to correspond to bit[0], then a recording head and a reproduction head (reproduction element) can be selected in the following manner, 00 H#0 recording head+outer reproduction element
01 H#0 recording head+inner reproduction element
02 H#1 recording head+outer reproduction element
03 H#1 recording head+inner reproduction element
04 H#2 recording head+outer reproduction element
05 H#2 recording head+inner reproduction element
06 H#3 recording head+outer reproduction element
07 H#3 recording head+inner reproduction element Further, as another method, there is a method, which independently provides a selection signal of a recording head and a reproduction head. In this method, two selection signals must be sent each time a head is switched, making for poorer selection signal transmission efficiency than the previous method. But there are cases in which the algorithm of the microprogram for control is simplified.

In the R/W amp 11 of this embodiment, (1) There are two recording terminals and three reproduction terminals (assuming one is a common terminal) for each head. Of course, if a common terminal is not used, then there are four reproduction terminals.

(2) In line with the above, the definition of a head selection signal will be as follows. For example, if a head number and a reproduction element number are made to correspond to predetermined bits, and the head selection signal is "00," this specifies the "No. 0 recording head and outer reproduction element." Further, if the head selection number is "01," this specifies the "No. 0 recording head and inner reproduction element." In other words, the corresponding relationship becomes as follows:

| Head Selection Signal | Recording Head No. | Reproduction Element |
|---|---|---|
| 00 | H#0 | Outer Reproduction Element |
| 01 | H#0 | Inner Reproduction Element |
| 02 | H#1 | Outer Reproduction Element |
| 03 | H#1 | Inner Reproduction Element |
| 04 | H#2 | Outer Reproduction Element |
| 05 | H#2 | Inner Reproduction Element |
| 06 | H#3 | Outer Reproduction Element |
| 07 | H#3 | Inner Reproduction Element |

Any ordinary channel can be used as the R/W channel, or a channel can be provided exclusively thereof or. The R/W channel. is inputted with reproduction signals outputted from R/W amp 11 and discriminates between signals, and, in addition, receives signals from the control portion and generates recording data to be sent to R/W amp 11. Memory 13 stores the R/W channel constant when either of the two reproduction elements mounted in each composite magnetic head 7 is selected, the R/W channel constant when the remaining one is selected, and the corresponding relationship therebetween. The control portion 12 issues a control signal 10 instructing the R/W amp 11 as to which head of the respective composite magnetic heads 7 should be selected when a malfunction is detected in a magnetic head either when a magnetic disk drive is being shipped, or after shipment.

In a magnetic disk drive of this embodiment, at the initialization stage, the first reproduction element of a composite magnetic head 7 is defined as the primary element, the second reproduction element is defined as the secondary element, and this corresponding relationship is stored in memory 13. Ordinarily, control portion 12 performs control such that the reproduction element defined as the primary element is used in reproduction by sending a control signal 10 to R/W amp 11 based on the corresponding relationship (definition of the head selection signal) between the above-mentioned primary element stored in memory 13, and the actual reproduction element. Conversely, as a test mode, there is provided a mode, whereby control is performed such that the reproduction element defined as the secondary element is used in reproduction by sending a control signal 10 to R/W amp 11 based on the corresponding relationship between the above-mentioned secondary element stored in memory 13, and the actual reproduction element. The switch between the above-mentioned ordinary mode and test mode is implemented by switching the control state of control portion 12 via a control command from the I/F (interface).

In the initial adjustment process and testing process for the manufacture of a magnetic disk drive, both a test for selecting the primary element and a test for selecting the secondary element are implemented, and the initial adjustment parameters for each element are evaluated and stored on a magnetic disk medium. When it is ascertained from the test results that there is a big difference in performance, control portion 12 has a function for revising the corresponding relationship stored in memory 13, and redefining as the primary element a reproduction element whose performance has been determined to be good. If this redefinition function is utilized, when it has been determined that the reproduction element of the one side is incapable of being used, it is also possible to define either the remaining primary element or secondary element alone as the available reproduction element.

Further, the corresponding relationship stored in memory 13 can be preserved by storing it on a magnetic disk medium. In this embodiment, the corresponding relationship between a reproduction element and a primary/secondary element and initial adjustment parameters are stored on a magnetic disk, but flash memory or some other nonvolatile memory can also be used.

Thus, because the initial adjustment parameters of a first and second reproduction element are stored in memory 13 together with the corresponding relationship between a primary and secondary element and a first and second reproduction element, initial adjustment parameters corresponding to a reproduction element can be set in the R/W channel in synchronization with the selection of this reproduction element in accordance with a control signal 10 from control portion 12.

When there is a malfunction in a recording or reproduction process which used the primary element, a retry is implemented by a command from control portion 12, and during retry, by implementing a retry with the secondary element at the least one time, recovery using the secondary element is possible even when trouble has occurred in the primary element, thus enabling greatly enhanced reliability. Further, when there is a malfunction in a recording/reproduction process that used a primary element, it is also possible to redefine an element corresponding to a secondary element as a primary element, enabling markedly increased reliability.

Figure 9:
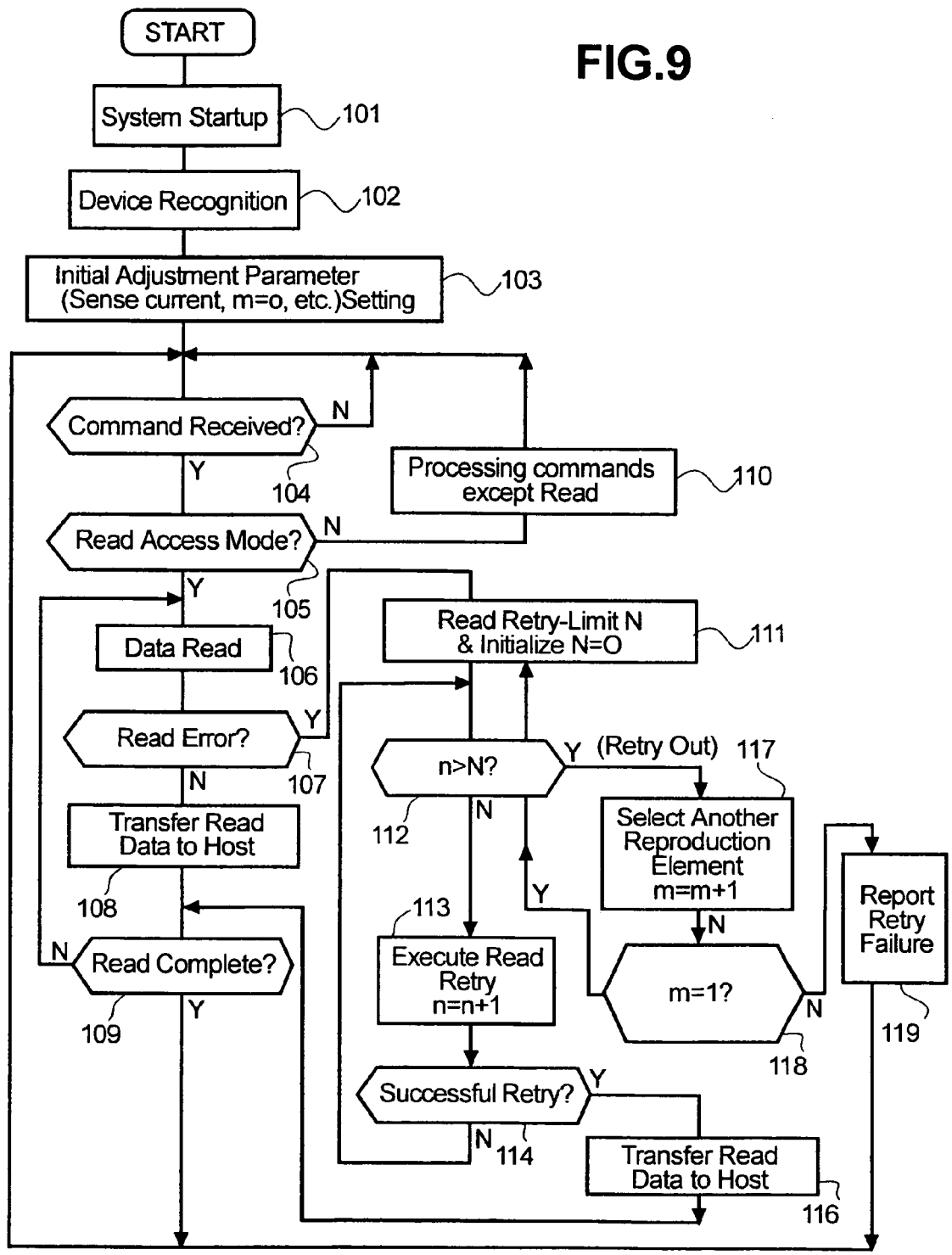
FIG. 9 is one example of a flowchart describing a method for switching reproduction elements of a composite magnetic head in an embodiment of the present invention.

One embodiment, which selects a reproduction element by performing retry control, will be explained hereinbelow by referring to the flowchart of FIG. 9. Furthermore, in this flowchart, a case in which a plurality of composite magnetic heads having two reproduction elements for one recording element will be explained.

First, when the magnetic disk drive is booted and other system startup functions are executed (Step 101), device recognition, which recognizes the connection of A magnetic disk drive under the command of a host computer not shown in the figure, is executed (Step 102). After that, mode parameter settings, which utilize a command descriptor block and vendor unique mode parameters not shown in the figure, are executed for the magnetic disk drive from the host computer as a part of the initialization sequence of SCSI (Small Computer Systems Interface), IDE (Integrated Drive Electronics) and other interface circuits (I/F), and initial adjustment parameter settings, such as the reproduction element to be set, the level of the sense current value to be set, and the initial value (m=0) for the reproduction element selection frequency, are performed for each composite magnetic head, respectively (Step 103).

Then, in the control portion 12, when command receipt is detected at command waiting (Step 104), a determination is made as to whether or not it is a read command (Step 105), and when it is a command other than read, the corresponding processing is performed (Step 110). Conversely, when it is a read command, data read is executed from a specified area of a magnetic disk medium (Step 106), and when there are no read errors (Step 107), read data is sent to the host computer 10 (Step 108) and Steps 106 through 108 are repeated until read processing has been completed (Step 109).

When a read error is detected in Step 107, a preset retry limit N is read out from memory 13 and, in addition, a retry frequency n is initialized (Step 111). After that, a determination is made as to whether or not the number of retries n up until that time is in excess of the retry limit N (Step 112), and when it is not in excess, read retry is executed and an operation is carried out to increment the retry frequency n (Step 113), and Step 112-Step 113 are executed until retry is successful (Step 114). When retry is successful, read data is sent to the host computer 10 (Step 116).

In Step 112, when the number of retries n is in excess of the retry limit N, a reproduction element other than the one used for read is selected, and the selection frequency m is incremented by 1 (Step 117). Then, if m is 1, a retry operation is executed once again, and if m is 2, the already performed reproduction element selection is carried out a second time, and since this results in the malfunctioning reproduction element being utilized once again (Step 118), it is determined that retry recovery is not possible, an error message is reported to the host computer (Step 119), and processing returns to command waiting.

Here, the explanation focused on performing retry control and selecting another reproduction element. Furthermore, as a realistic sequence, steps for switching the reproduction elements can be implemented up until retry out is executed (Step 112). In an ordinary retry sequence, since changes in R/W channel parameters and head offset are implemented at each step of retry, it is realistic to perform the reproduction element switching explained in this embodiment in accordance with these changes.

The effect of this embodiment is dramatically enhanced by striving to enhance the stability of the magnetic head main body like the magnetic head of FIG. 1. However, the effect of this embodiment is valid even as an effect resulting from the duplication of reproduction elements, and in the magnetic disk device of FIG. 8, the magnetic head is not limited to the one shown in FIG. 1. Further, if it is a composite magnetic head having two reproduction elements, one side can be used as a backup, thus enabling enhanced reliability. In addition, although not specifically shown in the figures, the present invention is not limited to using a composite magnetic head having two reproduction elements; striving for multiplexing by using a composite magnetic head having three or more reproduction elements is also effective.

By multiplexing reproduction elements inside a composite magnetic head, the yield of the composite magnetic head is enhanced, and the production ratio of successes to failures of the magnetic disk drive is improved dramatically. There is the effect that, even after shipment of a magnetic disk drive, high recovery performance can be maintained in addition to ordinary performance. Further, because it is possible to bring out the performance inherent in a MR element by lessening the influence of the recording magnetic field of a magnetic head, the performance of a magnetic disk drive can be enhanced.

Having described a preferred embodiment of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. A magnetic disk drive, comprising:
   a composite magnetic head having a recording element for recording information in tracks on a recording medium, and a plurality of reproduction elements being provided for one recording element, which are operatively associated only with said one recording element;
   a recording and reproduction amplifier of said composite magnetic head;
   a control portion which selects and sets one of the plurality of reproduction elements of said composite magnetic head;
   an interface circuit which transmits signals between the inside and outside of said magnetic disk drive; and
   a memory which stores initial adjustment parameters corresponding to the plurality of reproduction elements, wherein said control portion selects said one of the plurality of reproduction elements based on a corresponding relationship, stored in said memory, between said one of the plurality of reproduction elements and an actual reproduction element.

2. The magnetic disk drive according to claim 1, wherein said memory stores a corresponding relationship between an initial adjustment parameter used when said one of the plurality of reproduction elements mounted in said composite magnetic head is selected, and an initial adjustment parameter used when one of the remaining elements other than said one of the plurality of reproduction elements is selected.

3. The magnetic disk drive according to claim 1, wherein reproduction is performed by any one of the elements from among said plurality of reproduction elements, and said initial adjustment parameter is set in synchronization with the selection of each reproduction element.

4. The magnetic disk according to claim 1, wherein, as a test mode, said control portion performs control such that one of the remaining elements other than said one of the plurality of reproduction elements is used in reproduction by sending a signal control based on the corresponding relationship between said one of the remaining elements stored in said memory and an actual reproduction element.

5. The magnetic disk drive according to claim 1, wherein said control portion, when it has been determined that one of the plurality of reproduction elements is incapable of being used, is capable of determining one of the remaining elements as an available reproduction element.

6. The magnetic disk drive according to claim 1, wherein a command from said control portion implements a retry, when there is a malfunction in a recording or reproducing process which used one element, and during retry, implements a retry with another element at least one time.

7. The magnetic disk drive according to claim 1, further comprising a plurality of said composite magnetic head, wherein said control portion issues a control signal instructing a R/W amp as to which head of the respective composite magnetic heads should be selected when a malfunction is detected in a magnetic head either when a magnetic drive is shipped, or after shipment.

8. A magnetic disk drive, comprising:
   a composite magnetic head having a recording element for recording information in tracks on a recording medium, and a plurality of reproduction elements being provided for one recording element, which are operatively associated with only said one recording element;
   a recording and reproduction amplifier of said composite magnetic head;

a control portion which selects and sets one of the plurality of reproduction elements of said composite magnetic head;

an interface circuit which transmits signals between the inside and outside of a magnetic disk drive; and a memory which stores initial adjustment parameters corresponding to the plurality of reproduction elements, wherein a first reproduction element of said composite magnetic head is defined as a primary element, a second reproduction element is defined as a secondary element, a corresponding relationship between the primary element and the secondary element is stored in said memory, and said control portion performs controls such that the primary element is used in reproduction by sending a signal control based on the corresponding relationship, stored in said memory, between said primary element and an actual reproduction element.

9. The magnetic disk drive according to claim 8, wherein said memory stores a corresponding relationship between an initial adjustment parameter used when one of the plurality of reproduction elements mounted in said composite magnetic head is selected, and an initial adjustment parameter used when one of the remaining elements other than said one of the plurality of reproduction elements is selected.

10. The magnetic disk drive according to claim 8, wherein, as a test mode, said control portion performs control such that the secondary element is used in reproduction by sending a signal control based on the corresponding relationship between said secondary element stored in said memory and an actual reproduction element.

11. The magnetic disk drive according to claim 8, wherein said control portion has a function for revising said corresponding relationship stored in said memory, and redefining as the primary element a reproduction element other than said one of the plurality of reproduction elements.

12. The magnetic disk drive according to claim 8, wherein said control portion, when it has been determined that one of the plurality of reproduction elements is incapable of being used, is capable of determining either the primary element or the secondary element alone as the available reproduction element.

13. The magnetic disk drive according to claim 8, wherein a command from said control portion implements a retry, when there is a malfunction in a recording or reproducing process which used the primary element, and during retry, implements a retry with the secondary element at least one time.

* * * * *